Figure 1:
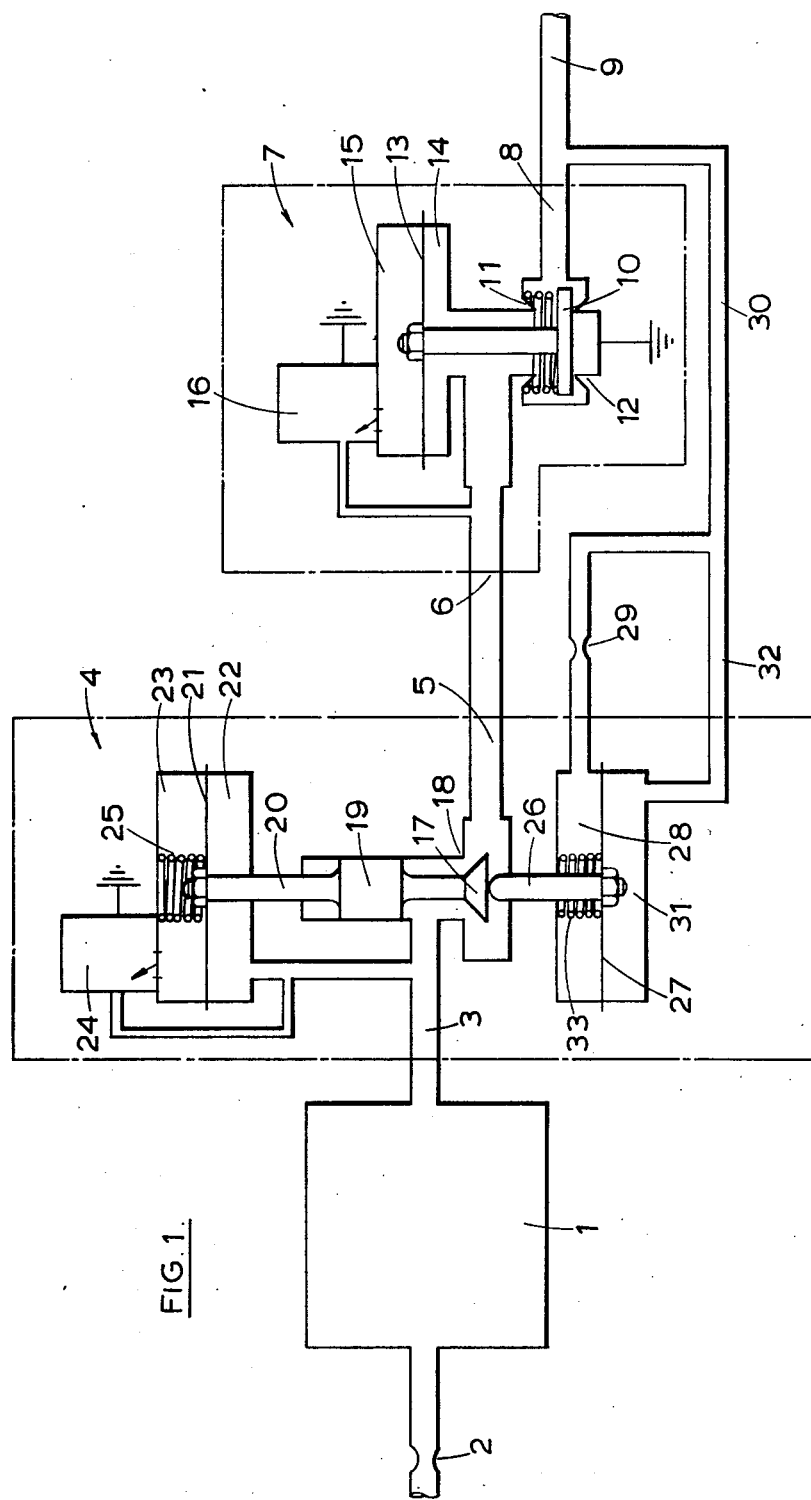

United States Patent [19]

Bayliss

[11] 4,073,546
[45] Feb. 14, 1978

[54] ANTI-SKID VEHICLE BRAKING SYSTEM

[75] Inventor: John Patrick Bayliss, Redditch, England

[73] Assignee: Girling Limited, Birmingham, England

[21] Appl. No.: 713,816

[22] Filed: Aug. 12, 1976

[30] Foreign Application Priority Data

Aug. 30, 1975 United Kingdom ............... 35854/75
May 11, 1976 United Kingdom ............... 19240/76

[51] Int. Cl.² ............................................. B60T 8/02
[52] U.S. Cl. .................................................. 303/115
[58] Field of Search ............... 303/115, 116, 119, 117, 303/118

[56] References Cited

U.S. PATENT DOCUMENTS

| 2,417,211 | 3/1947 | Newell | 303/118 |
| 3,713,708 | 1/1973 | Michellone et al. | 303/119 |
| 3,754,794 | 8/1973 | Durand | 303/119 |
| 3,837,710 | 9/1974 | Reinecke et al. | 303/119 |
| 3,844,623 | 10/1974 | Parsons et al. | 303/119 |

FOREIGN PATENT DOCUMENTS 2,300,696 7/1974 Germany ........................... 303/115

Primary Examiner—George E. A. Halvosa
Attorney, Agent, or Firm—Scrivener, Parker, Scrivener and Clarke

[57] ABSTRACT

In a fluid pressure-operated anti-skid braking system for rail and other vehicles operating fluid from a supply for actuating a wheel brake is supplied to the brake through a fluid-flow control valve interposed in the line between the supply and the brake. Deceleration responsive sensors responsive to a skid signal are incorporated for operating the valve to relieve the brake pressure of the fluid supplied to the brake when the deceleration of the wheel is excessive and exceeds a predetermined value. The valve incorporates a fluid pressure memory chamber for sensing the skid pressure, and the memory chamber provides a datum or changeover point between first and second successive stages of brake re-application following a skid.

11 Claims, 2 Drawing Figures

ANTI-SKID VEHICLE BRAKING SYSTEM

SPECIFIC DESCRIPTION

This invention relates to improvements in fluid pressure-operated anti-skid braking systems for rail and other vehicles of the kind in which operating fluid from a supply for actuating a wheel brake is supplied to the brake through fluid-flow control valve means interposed in the line between the supply and the brake, and deceleration responsive means responsive to a skid signal are incorporated for operating the valve means to relieve the brake pressure of the fluid supplied to the brake when the deceleration of the wheel is excessive and exceeds a predetermined value. Hereinafter the brake pressure to be relieved will be referred to as the "skid pressure".

Anti-skid braking systems are known in which the re-application of the brake pressure following its reduction on the occurence of a skid signal is controlled electrically by a device which memorises the skid pressure and ensures that that pressure is not exceeded during the next re-application.

A disadvantage of an electric memory is that components can fail.

According to our invention in an anti-skid braking system of the kind set forth the valve means incorporates a fluid pressure memory chamber for sensing the skid pressure, and the memory chamber provides a datum or change-over point between first and second successive stages of brake re-application, the first stage comprising the re-application of the operating fluid from the supply at the original rate until an intermediate pressure less than the skid pressure is attained at the changeover point, and the second stage comprising the continued re-application of the supply of operating fluid at a reduced rate.

By providing a two-stage re-application has the advantage that the brake can be re-applied relatively quickly by fluid pressure from the supply and the reduced or more gradual rate of re-application operative in the second stage after the changeover point has been reached is less likely to cause excessive deceleration to occur and the pressure of fluid can still rise to a value in excess of the skid pressure until it is equal to the pressure of the supply. Of course, should excessive deceleration again occur, for example at a skid pressure less than the previous skid pressure, the deceleration responsive means are again operative to relieve the pressure supplied to the brake, with re-application taking place automatically in two stages, but with the memory chamber determining an intermediate pressure at the changeover point which is less than the particular skid pressure generated in the immediately preceding brake application.

Preferably the memory chamber incorporates a decay so that the datum or changeover point and the corresponding intermediate pressure will reduce automatically in the time interval between successive brake re-applications in a common braking sequence. Thus, the memory chamber enables the valve means to regulate the output pressure which it supplies to the brake as a function of the output pressure supplied to the brake from the valve means in an immediately preceding brake application in which the skid pressure is attained.

Preferably a volume of fluid at the skid pressure of an immediately preceding brake application or re-application is trapped in the memory chamber, and a re-application valve for controlling flow from the supply to the brake is operated by a control member responsive to a differential between the pressure in the memory chamber and the brake pressure during a successive brake re-application.

In one construction the valve means comprises a re-application valve assembly in which the memory chamber is incorporated, and a dump valve assembly, the re-application valve assembly having an inlet connected to the supply, and an outlet connected to the inlet of the dump valve assembly, and the dump valve assembly having an outlet connected to an actuator of the brake, and the maximum opening of a re-application valve which controls communication between the inlet and the outlet of the re-application valve assembly is controlled by a control member having opposed first and second areas exposed respectively to the memory chamber and to a second chamber on the opposite side of the control member, both chambers being connected to the outlet of the dump valve assembly, and a restrictor being incorporated in a connection between the memory chamber and the dump valve assembly outlet, the arrangement being such that a difference in pressure between the two chambers reduces the maximum opening of the re-application valve.

Preferably the control member comprises a movable abutment member which is engageable by the valve member of the re-application valve to limit its opening.

The first and second areas conveniently comprise opposite sides of a diaphragm secured to the abutment member.

The abutment member is preferably resiliently biassed out of engagement with the re-application valve member.

In a modification a second restrictor may be incorporated in series with the first in the connection between the memory chamber and the dump valve outlet, and a one-way valve is connected in parallel between a point between the two restrictors and the second connection between the second chamber and the dump valve outlet.

Thus the rate at which the pressure in the memory or first chamber can decay is different from the rate at which it can rise. This has the advantage that the system is more suited to electronic deceleration sensing means, and better stopping distances are maintained.

Preferably the one-way valve permits flow in a direction from the first connection and the second connection so that the rate of decay is greater than the rate of pressure rise.

The system also incorporates a latch valve connected between the two chambers and constructed and arranged to equalise the pressures in the chambers during a normal brake application under non-skid conditions, thereby preventing the control member from closing the re-application valve.

Figure 2:
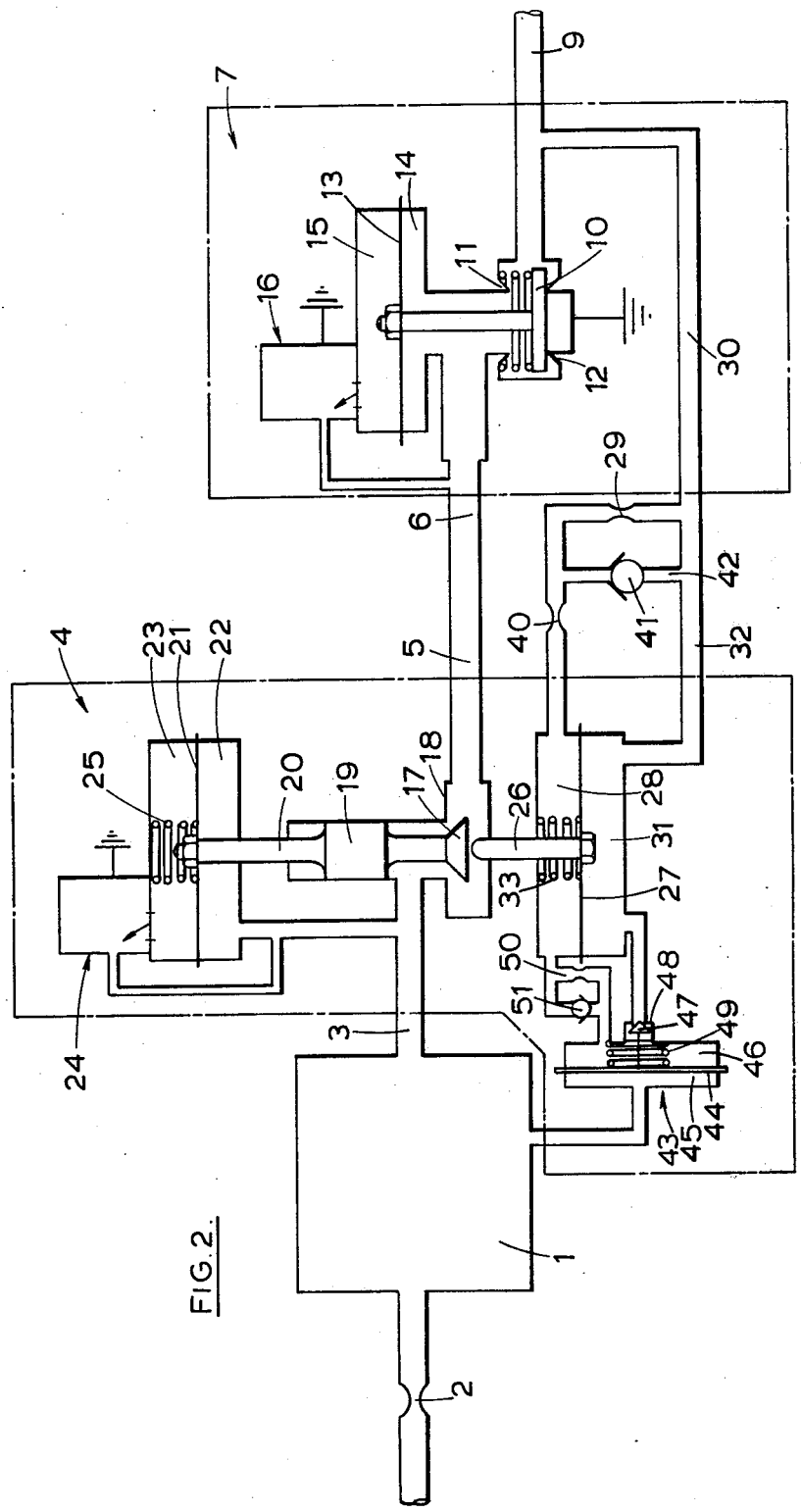

Two embodiments of our invention are illustrated in the accompanying drawings in which:

FIG. 1 is a layout of a braking system suitable for a rail vehicle in which the valve members are in the positions they occupy prior to receipt of a skid signal; and FIG. 2 is a layout similar to FIG. 1 but showing a modification.

In the braking system illustrated in FIG. 1 a reservoir 1 is connected through a distributor valve 2 and a brake-applying valve (not shown) to a pneumatic pressure supply (not shown). The function of the distributor valve is to control the rate of build up of brake pressure on application of the brake-applying valve.

The reservoir 1 is connected to the inlet 3 of a re-application valve assembly 4, indicated by the dotted enclosure, the outlet 5 of which is connected to the inlet 6 of a conventional dump valve assembly 7, also indicated by a dotted enclosure. The outlet 8 of the dump valve assembly is connected by a line 9 to brake actuators, not shown.

The re-application valve assembly 4 and the dump valve assembly 7 together constitute fluid-flow control means.

The dump valve assembly comprises a valve member 10 adapted to co-operate with opposed seats 11 and 12 and controlled by a diaphragm 13 the underside of which is exposed to a chamber 14 in permanent communication with inlet 6, and the upperside is exposed to a chamber 15 connected through a solenoid-operated valve assembly 16 to the inlet 6. The solenoid valve assembly 16 is electrically connected to a skid sensing means, not shown.

The re-application valve assembly comprises a re-application valve member 17 adapted to cooperate with a valve seat 18 of which opposite sides are connected to the inlet 3 and the outlet 5. The valve member 17 is integral with a piston 19 and an actuating rod 20 secured to a diaphragm 21. Preferably the cross-sectional area of piston 19 is equal to that of the valve seat 18 so as to balance the force of inlet pressure acting on the valve member 17.

The underside of diaphragm 21 is exposed to a chamber 22 permanently connected to the inlet 3, and its upperside is exposed to a chamber 23 connected to the inlet 3 through a solenoid-operated valve assembly 24 electrically connected to the skid sensing means. A compression spring 25 in the chamber 23 biasses the valve member 17 to an open position.

A rod 26 secured to a diaphragm 27 acts as an abutment member limiting the spacing of the valve member 17 from the seat 18. The upperside of diaphragm 27 is exposed to a first memory chamber 28 connected through a restrictor 29 and a line 30 to the outlet 8 of the dump valve assembly 7, and the underside of the diaphragm 27 is exposed to a second chamber 31 also connected to the dump valve assembly outlet 8 by lines 32 and 30. A compression spring 33 located in the first chamber 28 biasses the rod 26 downwardly to the equilibrium position shown.

The operation of the system will now be described. On application of the brake applying valve the system becomes pressurised at a rate determined by the distributor valve 2. The size of the restrictor 29 is chosen such that it offers substantially no resistance to flow at this rate. The pressures in the memory chamber 28 and the second chamber 31 thus rise at substantially the same rate and the position of the rod 26 is unaffected since the opposed sides of diaphragm 27 are of substantially equal area. The chamber 23 of the re-application valve assembly is connected to inlet 3 so that chambers 23 and 22 are at the same pressure, and valve member 17 is in an open equilibrium position shown.

The chamber 15 of the dump valve assembly is connected to inlet 6 so that the chambers 14 and 15 are under equal pressures and the valve member 10 is in engagement with seat 12 so that there is communication between inlet 6 and outlet 8.

In this condition all parts of the system are at the same pressure which is equal to that of the reservoir 1.

On receipt of a skid signal when the brake pressure attains the skid pressure the solenoid of valve assembly 16 is energised to cut off communication between the chamber 15 and the inlet 6 and to exhaust the chamber 15 to atmosphere. Simultaneously the solenoid of valve assembly 24 is energised to cut off communication between the chamber 23 and the inlet 3 and to exhaust the chamber 23 to atmosphere. The air pressure in the chamber 14 acting on the underside of the diaphragm of the dump valve assembly 7 raises the valve member 10 away from the seat 12 into engagement with the seat 11 thereby isolating the inlet 6 from the outlet 8 and connecting the outlet 9 to atmosphere through the seat 12 to dump air from the brake actuator. The air pressure in the chamber 22 acting on the underside of the diaphragm 21 similarly raises the valve member 17 into engagement with the seat 18.

On connection of the outlet 8 of the dump valve assembly to atmosphere the air in the chambers 28 and 31 starts to vent to atmosphere through the line 30. Air from the memory chamber 28 however must pass through the restrictor 29 so that the rate of fall of pressure or the decay of the pressure in the memory chamber 28 is much slower than that in the chamber 31. The rod 26 will therefore tend to move downwardly owing to the difference in pressures acting on the opposite sides of diaphragm 27, and the action of spring 33 until it abuts a stop, not shown.

On termination of the skid signal the solenoid of solenoid valve assembly 16 is first de-energised to reconnect the chamber 15 with the inlet 6 so that valve member 10 moves away from the valve seat 11 and into engagement with the valve seat 12 to re-establish communication between the inlet 6 and the outlet 9 and to cut off the connection to atmosphere. Since valve member 17 is still in engagement with the seat 18 the pressure in chambers 28 and 31 will still be falling towards the pressure then present in the brake actuators.

After a delay the solenoid of assembly 24 is de-energised to allow the valve member 17 to move away from the seat 18. Since the rod 26 has moved away from the seat 18 the valve member 17 is able to move initially to its fully open position to allow a relatively fast initial repressurisation of the brake actuators in a first stage with air from reservoir 1. The pressures in the chambers 28 and 31 will now start to rise, but owing to the restrictor 29, the pressure in the memory chamber 28 rises at a slower rate than that in the chamber 31. Due to the difference in the pressures in the chambers 28 and 31 at a datum or changeover point the rod 26 therefore moves towards the valve seat 18 taking with it the valve member 17 to throttle the flow through the valve seat 18 and to reduce the subsequent rate of rise of pressure in the brake actuators from the reservoir 1. During the subsequent period in which the actuator pressure rises slowly, the position of the valve member 17 relative to the seat 18 is determined by the difference in pressures between the chambers 28 and 31 which gradually disappears.

Thus valve member 17 allows an initially rapid rate of repressurisation of the brake actuators in the first stage followed by a slower rate in a second stage when rod 26 is displaced towards seat 18 to define the datum or changeover point.

As the pressure in the memory chamber 28 rises to become equal to that in chamber 31, the rod 26 moves downwardly into its equilibrium position to allow the valve member 17 to move downwardly to the position shown in the drawings in readiness for a further cycle.

The residual pressure in the memory chamber 28 at the time of actuation of the re-application valve 4 to pressurise the brake actuators is a measure of the skid pressure which existed in the brake actuators on the initiation of a skid signal. After the initial rapid repressurisation of the brake actuators the further slow rise in actuator pressure is controlled in dependence upon the residual pressure in the memory chamber 28 and thus in dependence upon the skid pressure at which a skid signal was previously initiated.

In the braking system of FIG. 2 a second restrictor 40 is located in the same line as and in series with the restrictor 29 and a one-way valve 41 is located in a by-pass line 42 connected in parallel between the chambers 28 and 31 between a point intermediate the restrictors 40 and 29 and the line 32. The one-way valve 41 permits flow through the line 42 only in a direction into the line 32.

A latch valve 43 also controls communication between the chambers 28 and 31. The latch valve 43 comprises a diaphragm 44 which is exposed on one side to a chamber 45 exposed permanently to pressure in the reservoir 1, and on the other side is exposed to pressure in a chamber 46 which, in turn, is exposed to the chamber 31 through a valve comprising a valve member 47 carried by the diaphragm and engageable with a seating 48. A spring 49 carries the valve member 47 away from the seating so that the valve is open when the pressure in the chamber 46 equals that on the chamber 45.

The chamber 46 is also connected to the memory chamber 28 through a line containing a one-way valve 51 and a restrictor 50 arranged in parallel. The one-way valve permits flow from the chamber 46 to the memory chamber 28.

When the system is operated to apply air under pressure to brake actuators connected to the outlet 9 the system is pressurised with equal pressures applied throughout. The valve member 17 is in the open equilibrium position shown, the valve member 10 is in engagement with the seating 12, and the valve member 47 is spaced from the seating 48 so that the chambers 28 and 31 are subjected to equal pressures.

Upon receipt of a skid signal when the skid pressure is applied to the actuator the solenoid valves 24 and 16 exhaust air from the chambers 25 and 15 so that both the re-application valve 4 and the dump valve 7 close. This means that the valve member 17 engages with its seating 18 to isolate the reservoir 1 from the outlet 5, and urge the valve member 10 to engagement with the seating 11 to connect the outlet 9 to atmosphere. This dumps air from the actuator and from the chambers 31 and 46 so that the valve member 47 engages with the seating 48. Thus the latch valve 43 is closed and remains so during that brake applying sequence.

After the skid condition has been corrected and the solenoids of both valves 16 and 25 have been de-energised, the brakes are re-applied with the reservoir 1 being again placed in communication with the outlet 9. The pressure in the chamber 31 will rise rapidly but the pressure in the memory chamber 28 can rise only relatively slowly because the latch valve 43 is closed and due to the provision of the two restrictors 29 and 40 and the fact that no flow through the one-way valve 41 is possible in that direction. Therefore, after initial brake re-application in the first stage, the rod 26, which is separate from the valve member 17, moves upwardly to engage the valve member 17 urging it towards the seating 18 to reduce the rate of pressure increase of the outlet and finally cause the valve member 17 to engage with the seating. During this procedure the pressure in the memory chamber 28 rises and eventually the pressures on the members 28 and 31 equalise but at a pressure lower than the pressure at which skidding previously occurred.

The rod 26 is then moved with the diaphragm 27 away from the valve member 17, and the valve member 17 in turn moves away from the seating 28 to permit the pressure at the outlet to increase further.

The valve member 17 therefore has an "open and shut" characteristic which controls the braking pressure to give an initial rapid re-application followed by a controlled rise above a predetermined point during a skid condition.

During the re-application of the brake following a skid the pressure in the chamber 46 can rise only very slowly and at a rate of pressure increase less than that of which the pressire in the memory chamber 28 can increase due to the provision of the restriction 50. Thus, when a skid condition occurs and the valve member 47 engages with the seating 48, due to the chamber 45 being exposed to pressure in the reservoir 1 the latch valve 43 will remain shut during automatic brake re-application in a common cycle following a skid condition. Only at the termination of the brake cycle can the latch valve 43 normally re-open to facilitate rapid equalisation of the pressures in the chamber 28 and 31 on the first brake application in a subsequent brake applying cycle through the one-way valve 51. The latch valve 43 is therefore operative to ensure that the pressure in the chambers 28 and 31 are equalised during a normal brake application under non-skid conditions. Thus the diaphragm 27 is biassed by the spring 33 into a neutral position to prevent the rod 26 from urging the valve member 17 out of its equalibrium position and into engagement with the seating 18. However, due to the provision of the restriction 50, increase in pressure in the memory chamber 28 during a brake re-application in a common brake-applying cycle following a skid condition is also applied to the chamber 46, but with a delay, to cause the pressure in the chamber 46 to rise. This continues until the pressure in the memory chamber 28 equals that in the second chamber 31 whereafter the force of the pressure which has built-up in the chamber 46 and which acts on the diaphragm, plus the force in the spring 49, is sufficient to displace the diaphragm 44 in a direction to urge the valve member 47 away from the seating 48. Thus, after a delay or "time out", the brakes can be re-applied in a common brake-applying cycle at the original operating pressure.

The diaphragm 44 is of an area substantially greater than that of the seating 48. Thus, in the event of decrease in the pressure in the reservoir 1 after the brakes have been applied from the line 9, the latch valve 43 is maintained in the mode which it had assumed prior to the said decrease in pressure. For example, if the valve member 47 is spaced from the seating 48 a decrease in pressure in the reservoir 1 can not cause the valve member 47 to move towards the seating 48. Also, when the valve member 47 is in engagement with the seating 48, the decreased pressure in the reservoir 1 acting over the area of the diaphragm 44 will still be sufficient to exert a greater force on the valve member 47 than that acting in the opposite direction, namely the force in the spring 49 plus the pressure in the chamber 31 acting over the area of the seating 48.

The construction and operation of the braking system is otherwise the same as that of the system disclosed in FIG. 1 and corresponding reference numerals have been applied to corresponding parts.

I claim:

1. A fluid pressure-operated anti-skid braking system for rail and other vehicles comprising at least one actuator for applying a wheel brake, a supply of operating fluid for operating said actuator, fluid flow control valve means interposed between said supply and said brake and through which fluid from said supply is supplied to said actuator, deceleration responsive means responsive to a skid signal for operating said valve means to relieve brake skid pressure applied to said actuator when the deceleration of said wheel is excessive and exceeds a predetermined value, a fluid pressure memory chamber for sensing said skid pressure applied to said actuator on the downstream side of said control valve means whereby said skid pressure sensed by said memory chamber can never exceed the said skid pressure applied to said actuator to cause excessive deceleration of said wheel, wherein said memory chamber provides a changeover point between first and second successive stages of re-application of fluid from said supply to said actuator, said first stage comprising re-application of said fluid at a normal original rate until an intermediate pressure less than said skid pressure is attained at said changeover point, and said second stage comprising continued re-application of said fluid but at a reduced rate, and wherein said valve means comprises a re-application valve in which said memory chamber is incorporated and having an inlet connected to said supply and an outlet, a dump valve assembly having an inlet connected to said outlet of said re-application valve assembly and an outlet connected to said actuator, and a control member for controlling the maximum opening of said re-application valve, said control member having opposed first and second areas exposed respectively to said memory chamber and to a second chamber on the opposite side of said control member from said memory chamber, first and second connections between both said chambers and said outlet of said dump valve assembly, and a first restrictor incorporated in said connection between said memory chamber and said outlet of said dump valve assembly, the arrangement being such that a difference in pressure between the said two chambers biasses said control member in a direction to reduce the maximum opening of said re-application valve.

2. An anti-skid braking system as claimed in claim 1, wherein a second restrictor is incorporated in series with said first restrictor in said first connection between said memory chamber and said outlet of said dump valve, and a one-way valve is connected in parallel between a point between said first and second restrictors and said second connection between said second chamber and said outlet of said dump valve.

3. An anti-skid braking system as claimed in claim 2, wherein said one-way valve permits flow in a direction from said first connection to said second connection so that the rate of decay of pressure in said memory chamber is greater than the rate of pressure rise therein.

4. A fluid pressure operated anti-skid braking system for rail and other vehicles comprising at least one actuator for applying a wheel brake, a supply of operating fluid for operating said actuator, fluid flow control valve means interposed between said supply and said brake and through which fluid from said supply is supplied to said actuator, deceleration responsive means responsive to a skid signal for operating said valve means to relieve brake skid pressure applied to said actuator when the deceleration of said wheel is excessive and exceeds a predetermined value, said valve means incorporating a fluid pressure memory chamber for sensing said skid pressure, wherein said memory chamber provides a changeover point between first and second successive stages of re-application of fluid from said supply to said actuator, said first stage comprising re-application of said fluid at a normal original rate until an intermediate pressure less than said skid pressure is attained at said changeover point, and said second stage comprising continued re-application of said fluid but at a reduced rate, wherein said valve means comprises a re-application valve in which said memory chamber is incorporated and having an inlet connected to said supply and an outlet, a dump valve assembly having an inlet connected to said outlet of said re-application valve assembly and an outlet connected to said actuator, and a control member for controlling the maximum opening of said re-application valve, said control member having opposed first and second areas exposed respectively to said memory chamber and to a second chamber on the opposite side of said control member from said memory chamber, first and second connections between both said chambers and said outlet of said dump valve assembly, and a first restrictor incorporated in said connection between said memory chamber and said outlet of said dump valve assembly, the arrangement being such that a difference in pressure between the said two chambers biasses said control member in a direction to reduce the maximum opening of said re-application valve, and wherein said re-application valve comprises a seating and a valve member movable towards and away from said seating said control member comprising a movable abutment member which is engagable by said valve member to limit movement of said valve member away from said seating.

5. An anti-skid braking system as claimed in claim 4, wherein said first and second areas comprise opposite sides of a diaphragm secured to said abutment member.

6. An anti-skid braking system as claimed in claim 4, including a spring for resiliently biassing said abutment member out of engagement with said valve member.

7. A fluid pressure-operated anti-skid braking system for rail and other vehicles comprising at least one actuator for applying a wheel brake, a supply of operating fluid for operating said actuator, fluid flow control valve means interposed between said supply and said brake and through which fluid from said supply is supplied to said actuator, deceleration responsive means responsive to a skid signal for operating said valve means to relieve brake skid pressure applied to said actuator when the deceleration of said wheel is excessive and exceeds a predetermined value, said valve means incorporating a fluid pressure memory chamber for sensing said skid pressure, wherein said memory chamber provides a changeover point between first and second successive stages of re-application of fluid from said supply to said actuator, said first stage comprising re-application of said fluid at a normal original rate until an intermediate pressure less than said skid pressure is attained at said changeover point, and said second stage comprising continued re-application of said fluid but at a reduced rate, wherein said valve means comprises a re-application valve in which said memory chamber is incorporated and having an inlet connected to said supply and an outlet, a dump valve assembly having an inlet connected to said outlet of said re-application valve assembly and an outlet connected to said actuator, and a control member for controlling the maximum opening of said re-application valve, said control member having opposed first and second areas exposed respectively to said memory chamber and to a second chamber on the opposite side of said control member from said memory chamber, first and second connections between both said chambers and said outlet of said dump valve assembly, and a first restrictor incorporated in said connection between said memory chamber and said outlet of said dump valve assembly, the arrangement being such that a difference in pressure between the said two chambers biasses said control member in a direction to reduce the maximum opening of said re-application valve, incorporating a latch valve connected between the said two chambers and constructed and arranged to equalise the pressure in the said chambers during a normal brake application under non-skid conditions, thereby preventing said control member from closing said re-application valve.

8. An anti-skid braking system as claimed in claim 7, wherein said latch valve comprises a seating disposed between said two chambers, a valve member for engagement with said seating, a diaphragm for controlling operation of said valve member and having one side exposed to said supply of operating fluid to urge said valve member towards said seating against pressure acting on the opposite side of said diaphragm, and wherein said diaphragm is of an area larger than that of said seating so that a reduction in said pressure of said operating supply does not affect the mode of said latch valve.

9. An anti-skid braking system as claimed in claim 8, wherein a restriction is located between said latch valve and said memory chamber to enable pressure acting on opposite sides of said diaphragm to equalise after a delay following equalisation of the pressures on opposite sides of said control member.

10. An anti-skid braking system as claimed in claim 9, wherein a one-way valve is connected in parallel with said restriction to permit flow of fluid from said latch valve into said memory chamber.

11. An anti-skid braking system as claimed in claim 8, wherein a spring biasses said valve member away from said seating.

* * * * *